United States Patent [19]
Skarbo et al.

[11] Patent Number: 6,108,028
[45] Date of Patent: Aug. 22, 2000

[54] METHOD OF ACTIVATING AND DEACTIVATING A SCREEN SAVER IN A VIDEO CONFERENCING SYSTEM

[75] Inventors: Rune A. Skarbo, Kristiansand, Norway; Brian L. Kantor, Portland, Oreg.; Christopher C. Lawless, Forest Grove, Oreg.; Puneet Kukkal, Portland, Oreg.; Wayne R. Hlasnik, Tigard, Oreg.

[73] Assignee: Intel Corporation, Santa Clara, Calif.

[21] Appl. No.: 09/184,795

[22] Filed: Nov. 2, 1998

[51] Int. Cl.[7] ....................................... H04N 7/14
[52] U.S. Cl. ..................... 348/15; 379/93.21; 379/93.17; 345/330
[58] Field of Search ........................ 348/14, 15; 345/330, 345/339; 379/93.17, 93.21; 370/260; 395/200.34; 340/573

[56] References Cited

U.S. PATENT DOCUMENTS 5,914,747  6/1999  Hamilton .................................. 348/15

FOREIGN PATENT DOCUMENTS

| 0860809A2 | 8/1998 | European Pat. Off. | G09G 5/00 |
| 406311512 | 11/1994 | Japan | H04N 7/15 |
| 407271335A | 10/1995 | Japan | G09G 5/00 |

*Primary Examiner*—Curtis A. Kuntz
*Assistant Examiner*—Melur Ramakrishnaiah
*Attorney, Agent, or Firm*—Steven P. Skabrat

[57] ABSTRACT

Activation and deactivation of a screen saver in a video conferencing system is based on detected presence of a person in the room wherein the video conferencing system is sited and the current status of a videoconferencing session. The video conferencing system processes a screen save message received from an operating system and informs the operating system not to launch the screen saver if the video conferencing system detects that there is an active video conferencing session or if a presence detection technique has detected a presence in the room or area wherein the video conferencing system is sited within a predetermined time period. When a videoconferencing call is connected or a presence is detected and the screen saver is active, the screen saver is terminated. The presence may be detected by motion, sound, or other techniques.

17 Claims, 4 Drawing Sheets

METHOD OF ACTIVATING AND DEACTIVATING A SCREEN SAVER IN A VIDEO CONFERENCING SYSTEM

BACKGROUND

1. Field

The present invention relates generally to graphical user interfaces and displays of a system and, more specifically, to screen savers for system displays.

2. Description

Screen savers are programs that provide images for a display when a system is not in use to help avoid long term damage to the display. If a single image is continuously shown on a display for a long period of time, the image may be "burned in" to the components of the display. Other images subsequently shown on the display may then appear blurry or otherwise at least partially obscured due to the image burn-in. To overcome this, screen savers are commonly used. Screen savers typically provide a series of images to the display, often with entertaining effect. Screen savers are usually activated when a user-specified time period has passed after the last input event to the system, such as a keyboard action or a mouse click, for example. Screen savers are usually deactivated once an input device, such as a keyboard or mouse is used again.

The displays of video conferencing systems are also susceptible to image burn-in. Many video conferencing systems do not have a screen saver. For those video conferencing systems with a screen saver, traditional screen savers often are activated at inconvenient times (e.g., during a conference call or presentation) due to a lack of input events, although a video conferencing session may be active. This distracts users from their work, presentation, or conference call on which they are trying to interact.

What is needed is a method of implementing a screen saver that overcomes these deficiencies of existing video conferencing systems.

SUMMARY

An embodiment of the present invention is a method of controlling a screen saver process in a video conferencing system. The method includes detecting when a presence exists in an area where the video conferencing system is sited in a predetermined period of time, and activating the screen saver process when no presence has been detected for the predetermined period of time.

Another embodiment of the present invention is a video conferencing system coupled to a screen saver process. The video conferencing system includes a presence detection subsystem to detect when a presence exists in an area where the video conferencing system is sited in a predetermined period of time, and a control subsystem to activate the screen saver process when no presence has been detected in the predetermined period of time according to the presence detection subsystem.

BRIEF DESCRIPTION OF THE DRAWINGS

The features and advantages of the present invention will become apparent from the following detailed description of the present invention in which.

DETAILED DESCRIPTION

An embodiment of the present invention is a method and apparatus for activating and deactivating a screen saver in a video conferencing system based on the detected presence of one or more people in a room where the video conferencing system is sited. An embodiment of the present invention helps make video conferencing systems more user friendly and convenient to use. The context sensitive screen saver of an embodiment of the present invention may be based on several rules of operation, organization of videoconferencing software, and presence detection techniques.

There are at least three rules which may be used in an embodiment of the present invention to control the activation and deactivation of a screen saver in a video conferencing system based on detected presence. The first rule is that the screen saver may not be activated if the video conferencing system is being used for a conference. The second rule is that if a human presence is detected in the room where the video conferencing system is situated for a first predetermined period of time followed by a second predetermined period of time of no motion, it may be assumed that all people have left the room and the screen saver may be activated. The third rule is that if an incoming conference call is detected by the video conferencing system and the screen saver is active, the screen saver may be automatically deactivated (without employing user input actions such as keyboard or mouse inputs, for example, or detecting a presence in the room to initiate the deactivation process). Thus, a screen saver may be implemented such that its operation may be sensitive to the current context or status of the video conferencing system and the room in which the system is situated.

Figure 1:
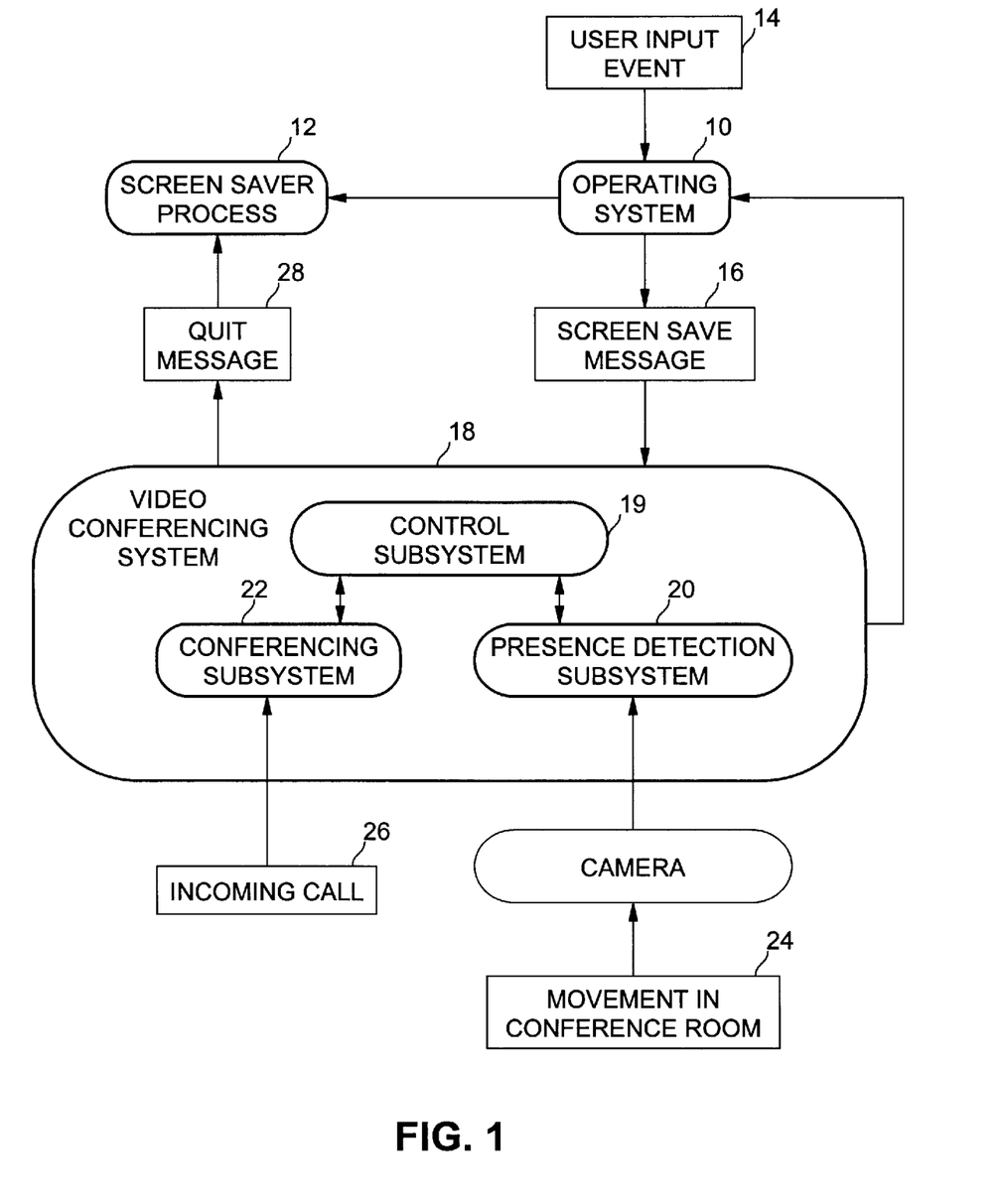
FIG. 1 is a diagram illustrating interaction between a video conferencing system, an operating system, and a screen saver process according to an embodiment of the present invention.

FIG. 1 is a diagram illustrating interaction between a video conferencing system, an operating system, and a screen saver process according to an embodiment of the present invention. Operating system 10 attempts to launch a screen saver process 12 after a specified time period has elapsed in which no user input event 14 (such as a keyboard input event or mouse input event, for example) is detected. In one embodiment, operating system 10 may be one of the various Windows™ operating systems versions commercially available from Microsoft Corporation, although other operating systems supporting a graphical user interface may also be used. Before launching the screen saver process 12, operating system 10 sends a screen save message 16 to all top level windows in the windowing system of the graphical user interface supported by the operating system to verify that it is acceptable for the screen saver to be launched. In one embodiment, one of the top level windows belongs to video conferencing system 18. Video conferencing system 18 may be a program for providing video conferencing capabilities, such as the TeamStation™ video conferencing system commercially available from Intel Corporation, for example, although the invention is not limited in scope in this respect. Video conferencing system 18 processes the screen save message and informs operating system 10 inhibit the launch of the screen saver if the video conferencing system detects that there is an active video conferencing session or if a presence detection technique has detected a presence in the room or area where the video conferencing system is sited within a predetermined time period. A presence for purposes of this invention comprises one or more people being in the room. Otherwise, video conferencing system 18 informs the operating system that the screen saver may be activated. An active video conferencing session in this context comprises either a telephone call or a video conferencing call having audio and video components, although it may comprise other events in other contexts.

Video conferencing system 18 comprises control subsystem 19, presence detection subsystem 20 and conferencing subsystem 22. If a person enters the room where the video conferencing system is situated, this presence 24 may be detected by presence detection subsystem 20 using well-known techniques. In one embodiment, the presence detection subsystem comprises a motion detection subsystem, wherein the presence of someone in the room may be detected based on video data signals received from camera 21 coupled to the video conferencing system. In another embodiment, the presence detection subsystem may comprise a sound detection subsystem, wherein the presence of someone in the room may be detected based on audio data signals received by one or more microphones (not shown). In other embodiments, other detection techniques based on well-known technologies such as infra-red lasers and/or sensors, room temperature changes, or other technologies may also be employed. In yet another embodiment, any two or more of these techniques may be employed by the presence detection subsystem.

An incoming video or telephone call 26 may be received by conferencing subsystem 22. These events may be reported by the conferencing subsystem to control subsystem 19. When a call is connected or presence is detected and the screen saver is active, the screen saver may be terminated. In this case, a quit message 28 may be sent by the control subsystem 19 to screen saver process 12 to deactivate the screen saver. Alternatively, when a user initiates a user input event 14, such as by moving the mouse or entering a key on a keyboard, for example, screen saver process 12 may be directly terminated by operating system 10.

Figure 2:
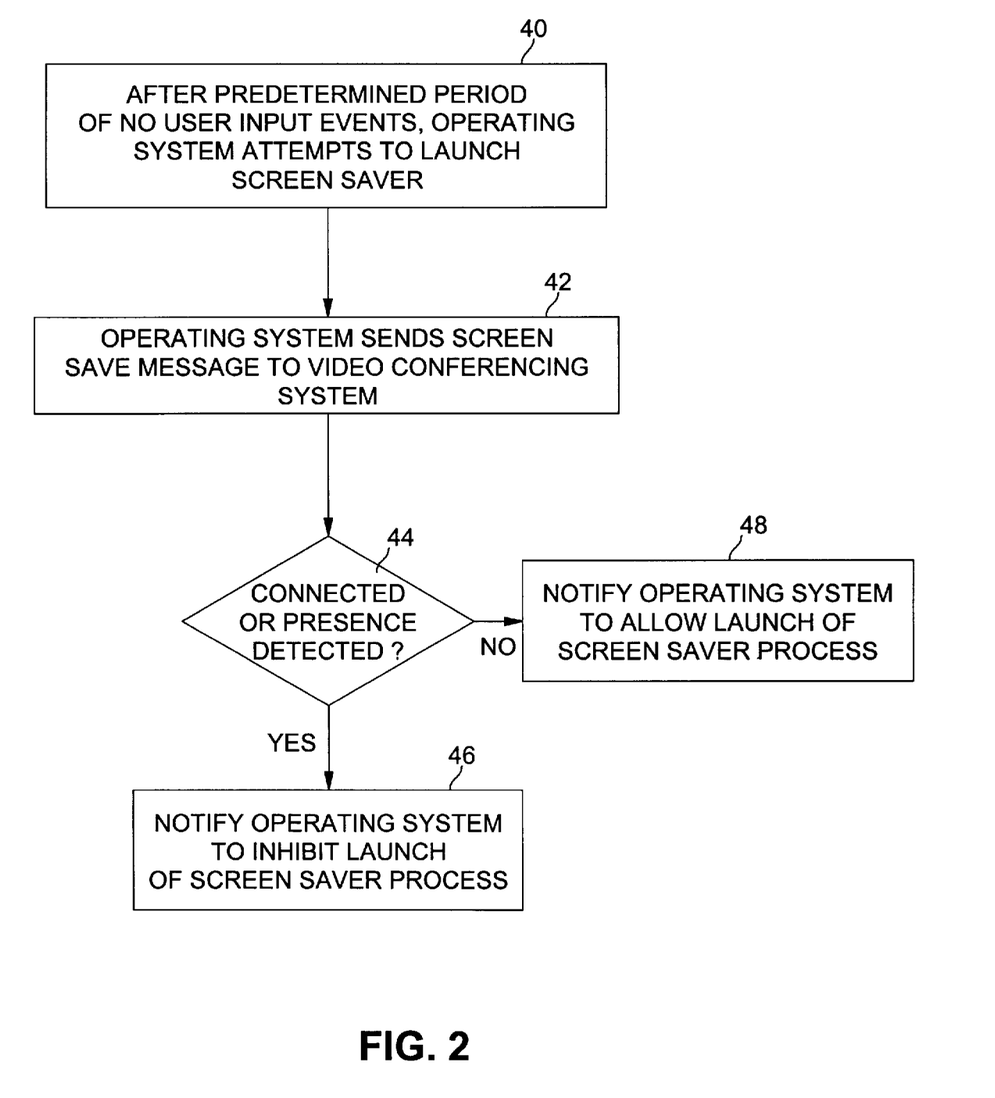
FIG. 2 is a flow diagram illustrating activation of a screen saver process according to one embodiment of the present invention.

FIG. 2 is a flow diagram illustrating activation of a screen saver process according to one embodiment of the present invention. After a predetermined period of time of no user input events, the operating system attempts to launch the screen saver process at block 40. At block 42, the operating system sends a screen save message to the control subsystem of the video conferencing system. If a call is connected to or a presence in the room is detected, in this embodiment, for example, by the video conferencing system at block 44, the control subsystem notifies the operating system to inhibit launch of the screen saver process at block 46. Otherwise, at block 48, the control subsystem notifies the operating system to allow launch of the screen saver process.

Figure 3:
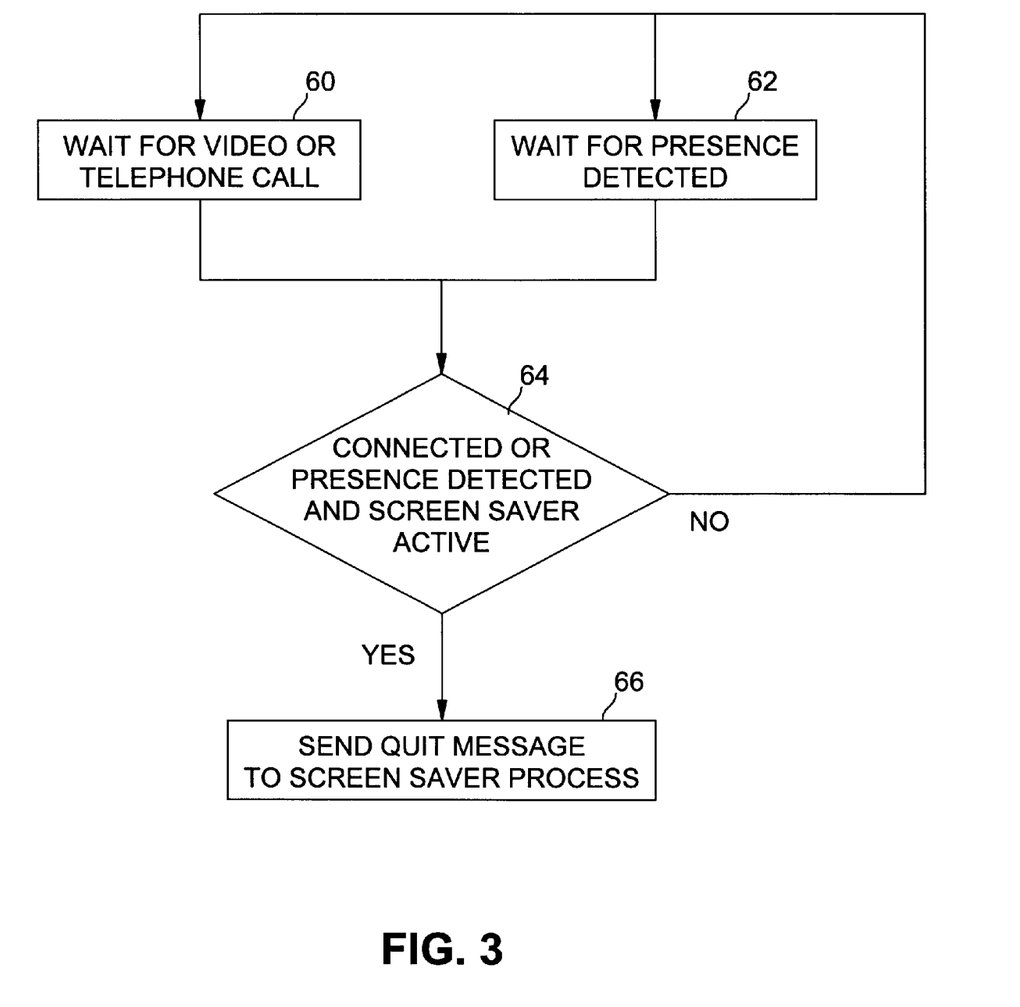
FIG. 3 is a flow diagram illustrating deactivation of a screen saver process according to one embodiment of the present invention.

FIG. 3 is a flow diagram illustrating deactivation of a screen saver process according to one embodiment of the present invention. The video conferencing system waits for a video or telephone call to be detected by the conferencing subsystem at block 60 or for a presence to be detected in the room by the presence detection subsystem at block 62. If a call is connected or a presence is detected and the screen saver process is active at block 64, the control subsystem sends a quit message to the screen saver process at block 66. Otherwise, the video conferencing system waits for further activity.

In the preceding description, various aspects of the present invention have been described. However, it is apparent to one skilled in the art that the present invention may be practiced without the specific details. In other instances, well-known features were omitted or simplified in order not to obscure the present invention.

Embodiments of the present invention may be implemented in hardware or software, or a combination of both. However, embodiments of the invention such as the video conferencing system, the operating system, and the screen saver process may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 4:
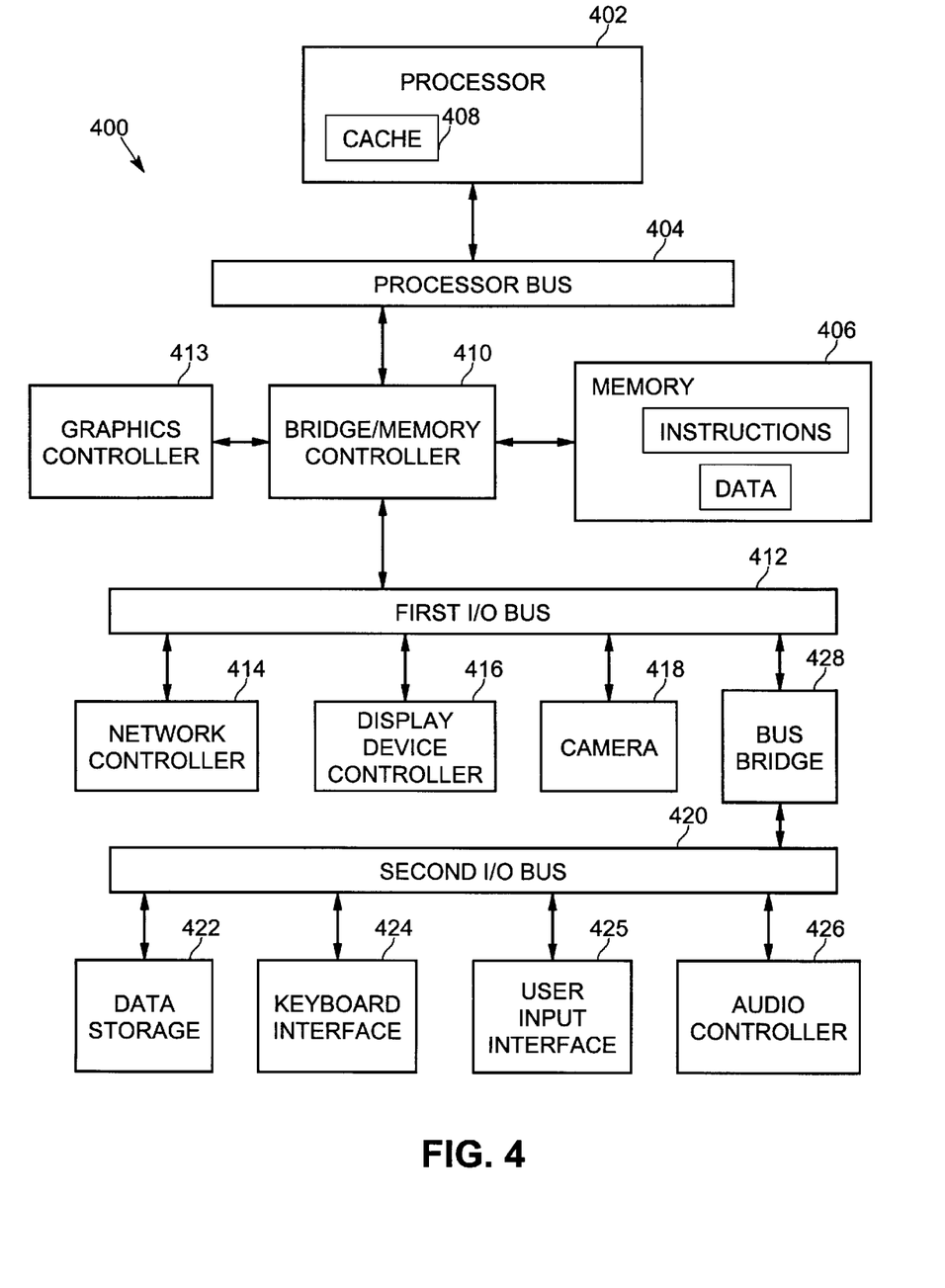
FIG. 4 is a diagram illustrating a sample system suitable to be programmed according to an embodiment of a context sensitive screen saver in a video conferencing system.

An example of one such type of processing system is shown in FIG. 4. Sample system 400 may be used, for example, to execute the processing for methods in accordance with the present invention, such as the embodiment described herein. Sample system 400 is representative of processing systems based on the PENTIUM®, PENTIUM® Pro, and PENTIUM® II microprocessors available from Intel Corporation, although other systems (including personal computers (PCs) having other microprocessors, engineering workstations, set-top boxes and the like) may also be used. In one embodiment, sample system 400 may be executing a version of the WINDOWS™ operating system available from Microsoft Corporation, although other operating systems and graphical user interfaces, for example, may also be used.

FIG. 4 is a block diagram of a system 400 of one embodiment of the present invention. The computer system 400 includes a processor 402 that processes data signals. The processor 402 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. Processor 402 may be coupled to a processor bus 404 that transmits data signals between processor 402 and other components in the system 400.

System 400 includes a memory 406. Memory 406 may be a dynamic random access memory (DRAM) device, a static random access memory (SRAM) device, or other memory device. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406. Cache memory 408 in this embodiment speeds up memory accesses by the processor by taking advantage of its locality of access. Alternatively, in another embodiment, the cache memory may reside external to the processor.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In some embodiments, the bridge/memory controller provides a graphics port for coupling to a graphics controller 413. In this embodiment, graphics controller 413 interfaces to a display device (not shown) for displaying images rendered or otherwise processed by the graphics controller 413 to a user. The display device may comprise a television set, a computer monitor, a flat panel display, or other suitable display device.

First I/O bus 412 may comprise a single bus or a combination of multiple buses. First I/O bus 412 provides communication links between components in system 400. A network controller 414 may be coupled to the first I/O bus 412. The network controller links system 400 to a network that may include a plurality of processing systems (not shown in FIG. 4) and supports communication among various systems. The network of processing systems may comprise a local area network (LAN), a wide area network (WAN), the Internet, or other network. In some embodiments, a display device controller 416 may be coupled to the first I/O bus 412. The display device controller 416 allows coupling of a display device to system 400 and acts as an interface between a display device (not shown) and the system. The display device may comprise a television set, a computer monitor, a flat panel display, or other suitable display device. The display device receives data signals from processor 402 through display device controller 416 and displays information contained in the data signals to a user of system 400.

In one embodiment, camera 418 may be coupled to the first I/O bus to provide video data signals for video conferencing capabilities. Camera 418 may comprise a digital video camera having internal digital video capture hardware that translates a captured image into digital graphical data. The camera may comprise an analog video camera having digital video capture hardware external to the video camera for digitizing a captured image. Alternatively, camera 418 may comprise a digital still camera or an analog still camera coupled to image capture hardware. A second I/O bus 420 may comprise a single bus or a combination of multiple buses. The second I/O bus 420 provides communication links between components in system 400. A data storage device 422 may be coupled to the second I/O bus 420. The data storage device 422 may comprise a hard disk drive, a floppy disk drive, a CD-ROM device, a flash memory device, or other mass storage device. Data storage device 422 may comprise one or a plurality of the described data storage devices.

A keyboard interface 424 may be coupled to the second I/O bus 420. Keyboard interface 424 may comprise a keyboard controller or other keyboard interface device. Keyboard interface 424 may comprise a dedicated device or may reside in another device such as a bus controller or other controller device. Keyboard interface 424 allows coupling of a keyboard to system 400 and transmits data signals from a keyboard to system 400. A user input interface 425 may be coupled to the second I/O bus 420. The user input interface may be coupled to a user input device, such as a mouse, joystick, or trackball, for example, to provide input data to the computer system. Audio controller 426 may be coupled to the second I/O bus 420. Audio controller 426 operates to coordinate the recording and playback of audio signals. A bus bridge 428 couples first I/O bridge 412 to second I/O bridge 420. The bus bridge operates to buffer and bridge data signals between the first I/O bus 412 and the second I/O bus 420.

Embodiments of the present invention are related to the use of the system 400 to provide a context sensitive screen saver for video conferencing. According to one embodiment, such a function may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to activate and deactivate a screen saver according to the context of the video conferencing system. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions well-known in the art. In particular, data storage device 422 may be used to provide long-term storage for the executable instructions and data structures for embodiments of methods of controlling context sensitive screen savers in accordance with the present invention, whereas memory 406 is used to store on a shorter term basis the executable instructions of embodiments of the methods for controlling context sensitive screen savers in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of controlling a screen saver process in a video conferencing system comprising:

detecting when a presence exists in an area where the video conferencing system is sited in a predetermined period of time and detecting when a video conferencing session is in progress;

activating the screen saver process only when no video conferencing session is in progress and when no presence has been detected for the predetermined period of time; and deactivating the screen saver process when initiation of a video conferencing session is detected.

2. The method of claim 1, wherein the video conferencing session comprises a telephone call or a video conferencing call.

3. The method of claim 1, further comprising:
deactivating the screen saver process when the presence is detected in the area.

4. The method of claim 1, wherein detecting the presence comprises detecting when a motion occurs in an area where the video conferencing system is sited in the predetermined period of time.

5. The method of claim 1, wherein detecting the presence comprises detecting when a sound occurs in an area where the video conferencing system is sited in the predetermined period of time.

6. A video conferencing system including a screen saver process, the video conferencing system comprising:
a presence detection subsystem to detect when a presence exists in an area where the video conferencing system is sited in a predetermined period of time;
a conferencing subsystem to detect when a telephone call or a video conferencing call is initiated; and
a control subsystem to activate the screen saver process when no presence has been detected in the predetermined period of time according to the presence detection subsystem and when no video conferencing session is in progress according to the conferencing subsystem;
wherein the control subsystem is adapted to deactivate the screen saver process when initiation of a video conferencing session is detected by the conferencing subsystem or when the presence is detected in the area by the presence subsystem.

7. The video conferencing system of claim 6, wherein the presence detection subsystem comprises a motion detection subsystem for detecting when a motion occurs in an area where the video conferencing system is sited in the predetermined period of time.

8. The video conferencing system of claim 6, wherein the presence detection subsystem comprising a sound detection subsystem for detecting when a sound occurs in an area where the video conferencing system is sited in the predetermined period of time.

9. An article comprising a machine readable medium having a plurality of machine readable instructions, wherein when the instructions are executed by a processor, the instructions cause a video conferencing system to detect when a presence exists in an area where the video conferencing system is sited in a predetermined period of time and when a video conferencing session is in progress, and to activate a screen saver process when no presence has been detected for the predetermined period of time and when no video conferencing session is in progress, and to deactivate the screen saver process when initiation of a video conferencing session is detected or when a presence is detected in the area.

10. The article of claim 9, wherein the instructions to detect the presence comprise instructions to detect when a motion occurs in an area where the video conferencing system is sited in the predetermined period of time.

11. The article of claim 9, wherein instructions to detect the presence comprise instructions to detect when a sound occurs in an area where the video conferencing system is sited in the predetermined period of time.

12. A method of controlling a screen saver process in a video conferencing system interacting with an operating system, the method comprising:

receiving a request from the operating system to initiate the screen saver process;

determining if a video conferencing session is in progress or if motion occurs in an area where the video conferencing system is sited in a predetermined period of time in response to the request;

signaling the operating system to allow launch of the screen saver process when no video conferencing session is in progress and no motion has occurred in the predetermined period of time; and signaling the operating system to inhibit launch of the screen saver process when a video conferencing session is in progress or motion has occurred in the predetermined period of time.

13. The method of claim 12, further comprising:
detecting when a video conferencing session is initiated and the screen saver is active;
sending a message to the screen saver process to terminate the screen saver process when a video conferencing session is initiated.

14. The method of claim 12, further comprising:
detecting when motion occurs in the area in the predetermined period of time and the screen saver is active; and
sending a message to the screen saver process to terminate the screen saver process when motion is detected in the area.

15. A method of controlling a screen saver process in a video conferencing system corresponding to the current operating context of the system comprising:
inhibiting the screen saver process from executing when the video conferencing system is in use for a video conference;
activating the screen saver process when a human presence is detected in a room where the video conferencing system is situated for a first predetermined period of time followed by a second predetermined period of time of no motion being detected;
deactivating the screen saver process when a human presence is detected in the room and the screen saver process is active; and
automatically deactivating the screen saver process when an incoming conference call is detected and the screen saver process is active.

16. A system comprising:
a screen saver process to display an image on a display;
an operating system to send a screen save message to top level windows of the system to verify that launch of the screen saver process is acceptable and to launch the screen saver process after a predetermined time period has elapsed in which no user input event is detected; and
a video conferencing system, the video conferencing system including a conferencing subsystem and a presence detection subsystem, to process the screen save message, to instruct the operating system to inhibit launch of the screen save process when the conferencing subsystem detects that there is an active video conferencing session or when the presence detection subsystem detects a human presence in a room where the system is sited within a predetermined time period, and to instruct the operating system to activate the screen saver process when the conferencing subsystem detects that there is no active video conferencing session and when the presence detection subsystem detects no human presence in a room where the system is sited within a predetermined time period.

17. The system of claim 16, wherein the presence detection subsystem comprises a motion detection subsystem that analyzes images captured by a camera coupled to the video conferencing system to detect the presence of motion in the images.

* * * * *

UNITED STATES PATENT AND TRADEMARK OFFICE
CERTIFICATE OF CORRECTION

PATENT NO.    : 6,108,028
DATED         : August 22, 2000
INVENTOR(S)   : Skarbo et al.

It is certified that error appears in the above-identified patent and that said Letters Patent is hereby corrected as shown below:

<u>Title page,</u>
Item [75], Inventors, delete "Rune Λ. Skarbo, Kristiansand, Norway" and insert -- Rune A. Skarbo, Frederiksberg, Denmark --.

Signed and Sealed this

Twenty-seventh Day of August, 2002

Attest:

Attesting Officer

JAMES E. ROGAN
Director of the United States Patent and Trademark Office